US012567671B2

(12) United States Patent
Molaei et al.

(10) Patent No.: US 12,567,671 B2
(45) Date of Patent: Mar. 3, 2026

(54) ANGLED MESHED PATCH ANTENNA ARRAY

(71) Applicant: Google LLC, Mountain View, CA (US)

(72) Inventors: Ali Molaei, Chicago, IL (US); Eddie Charles Burgess, Chicago, IL (US); Mohammad Reza Ghajar, Redwood, CA (US)

(73) Assignee: Google LLC, Mountain View, CA (US)

( * ) Notice: Subject to any disclaimer, the term of this patent is extended or adjusted under 35 U.S.C. 154(b) by 48 days.

(21) Appl. No.: 18/434,580

(22) Filed: Feb. 6, 2024

(65) Prior Publication Data

US 2025/0253532 A1 Aug. 7, 2025

(51) Int. Cl.
*H01Q 9/04* (2006.01)
*H01Q 21/29* (2006.01)

(52) U.S. Cl.
CPC ........... *H01Q 9/0414* (2013.01); *H01Q 21/29* (2013.01)

(58) Field of Classification Search
CPC ............................. H01Q 9/0414; H01Q 21/29
See application file for complete search history.

(56) References Cited

U.S. PATENT DOCUMENTS 11,696,390 B2 * 7/2023 Han ..................... H05K 1/0219 343/893
2017/0317418 A1 11/2017 Garcia et al.
2019/0103682 A1 4/2019 Thai et al.
2019/0288377 A1 9/2019 Ying et al.
2019/0305429 A1 10/2019 Ying et al.
2019/0334241 A1 10/2019 Han et al.
2019/0363458 A1 11/2019 Park et al.
2020/0021015 A1 1/2020 Yun et al.
2020/0144711 A1 5/2020 Lee et al.
2020/0203834 A1 6/2020 Asaf et al.
2021/0098882 A1 4/2021 Paulotto et al.
2021/0296759 A1 9/2021 Kim et al.
2021/0367357 A1 11/2021 Jia
2021/0391645 A1 12/2021 Seo et al.
2023/0139460 A1 5/2023 Woo et al.
2023/0282959 A1 9/2023 Yeon et al.

(Continued)

FOREIGN PATENT DOCUMENTS

EP 3614493 A1 2/2020

OTHER PUBLICATIONS

Baccouch et al., "Design-of-a-Compact-Meshed-Antennas-for-5G-Communication-Systems", retrieved from https://www.researchgate.net/publication/33964 4197_Design-of-a-Compact-Meshed-Antennas-f or-5G-Communication- Systems, Oct. 2019, 6 pp.

(Continued)

*Primary Examiner* — Seung H Lee
(74) *Attorney, Agent, or Firm* — Shumaker & Sieffert, P.A.

(57) ABSTRACT

An example wireless communication device includes a multi-layer substrate; and an antenna array having planes formed by features of the multi-layer substrate, wherein the features of the multi-layer substrate that form the planes of the antenna array include a plurality of vias and a plurality of traces arranged in a mesh structure, and wherein an angle between the planes of the antenna array and layers of the multi-layer substrate is greater than zero and less than 90.

16 Claims, 10 Drawing Sheets

(56) References Cited

U.S. PATENT DOCUMENTS

2023/0307817 A1 9/2023 Hwang et al.

OTHER PUBLICATIONS

Rohit Khandekar et al., "Gain enhanced mm-wave dipole patch antenna with an end-fire radiation for 5g applications", retrieved from: https://ieeexplore.ieee.org/abstract/document/10 047806, Dec. 2022, 4 pp.

International Search Report and Written Opinion of International Application No. PCT/US2024/042751 dated Nov. 13, 2024, 11 pp.

Office Action from counterpart Application No. 113132280 dated Oct. 16, 2025, 14 pp. Machine Translation Attached.

Response to Office Action dated Oct. 16, 2025, from counterpart TW Application No. 113132280 filed Jan. 14, 2026, 10 pp. Machine translation provided.

* cited by examiner

ANGLED MESHED PATCH ANTENNA ARRAY

BACKGROUND

Computing devices such as mobile computing devices, tablets, and the like may include antennas to transmit signals using wireless protocols such as $5^{th}$ generation (5G) millimeter wave (MM wave) protocols.

SUMMARY

Electronic devices, such as mobile computing devices (e.g., phones, tablets, etc.), with 5G MM wave capabilities may need to meet spatial coverage requirements stated by third-generation partnership project (3GPP) and carrier requirements. In some examples, such requirements may be met with designs having at least two antenna arrays facing different directions (e.g., to enhance coverage). Some of such designs may utilize multiple phase array integrated circuits (IC) and multiple antenna in package (AiP) modules. A mobile computing device having at least two antenna arrays facing different directions with different multiple phase array ICs and multiple AiP modules may face high insertion losses at 24 to 40 GHz frequency range. Such high insertion losses may be undesirable. In addition, the AiP modules in these designs may connect to the mobile computing device's main logic board (MLB) through a cable to bring power and radio frequency (RF) signals to the AiP modules for up/down-conversion and amplification, which may lead to increased cost (e.g., cost of cable) and/or signal loss as signals are transmitted through a respective cable.

In accordance with one or more aspects of this disclosure, a mobile computing device may include a plurality of antenna arrays that each include a plurality of planes (e.g., a ground plane and/or a patched plane), with at least one plane of the plurality of planes of at least one antenna array being formed by a meshed patch structure. The meshed patch structure may include a plurality of vias and traces arranged in a mesh-like structure. The mobile computing device may further comprise an integrated circuit (e.g., a single IC) configured to drive the plurality of antenna arrays.

Utilizing the aforementioned mesh patch structure may provide various advantages. As one example, the meshed patch structure may enable the plurality of antenna arrays to use the same IC to drive the transmission of signals (e.g., as opposed to using a dedicated phase array IC and cables for each respective antenna array). In this way, aspects of this disclosure may reduce insertion losses, enhance coverage and/or reduce costs to produce a mobile computing device.

An example device includes a multi-layer substrate; and an antenna array having planes formed by features of the multi-layer substrate, wherein the features of the multi-layer substrate that form the planes of the antenna array include a plurality of vias and a plurality of traces arranged in a mesh structure, and wherein an angle between the planes of the antenna array and layers of the multi-layer substrate is greater than zero.

The details of one or more examples are set forth in the accompanying drawings and the description below. Other features, objects, and advantages of the disclosure will be apparent from the description and drawings, and from the claims.

DETAILED DESCRIPTION

Figure 1B:
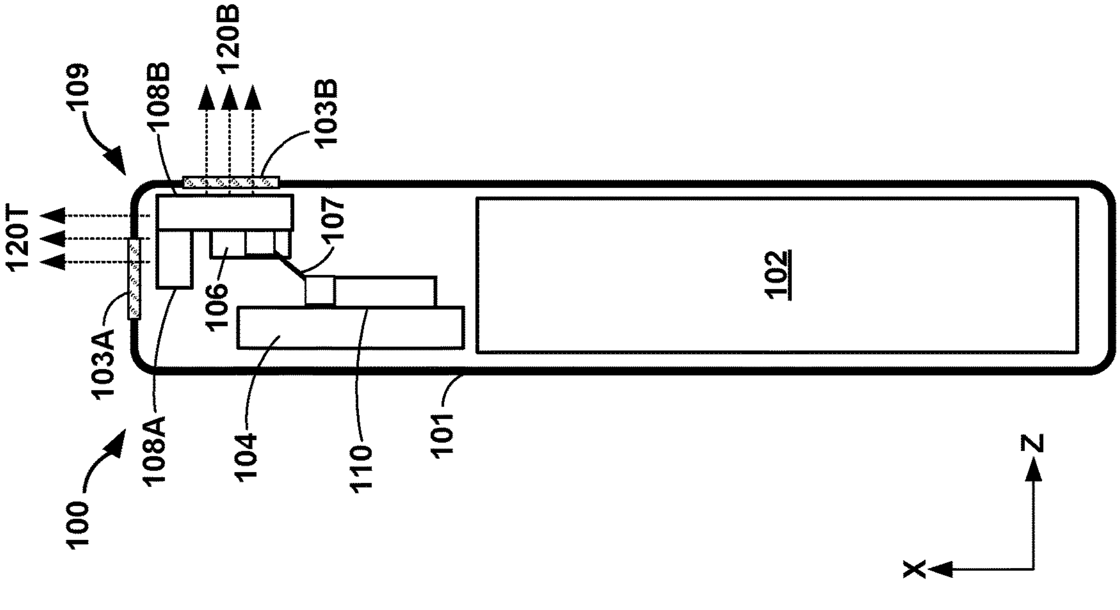
FIGS. 1A and 1B are schematic views of an example computing device 100 that includes an antenna module with at least one mesh patch antenna, in accordance with one or more aspects of this disclosure.
Figure 1A:
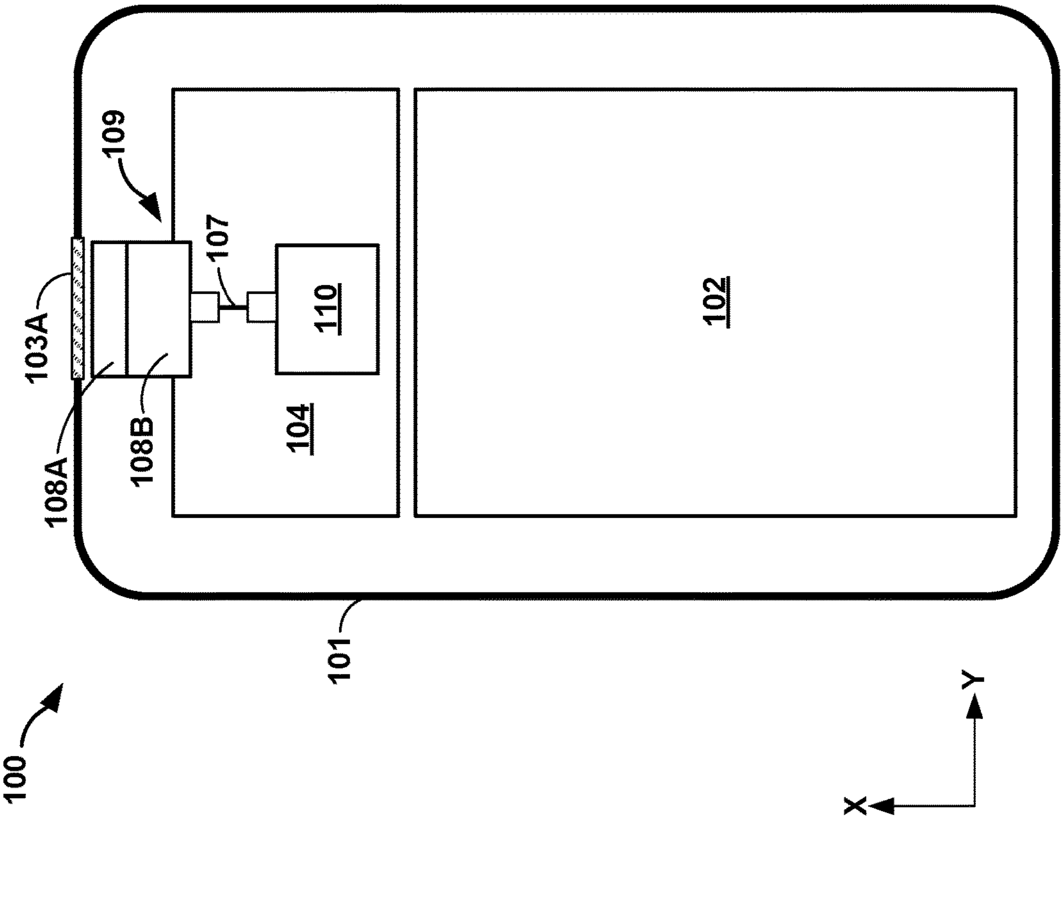

FIGS. 1A and 1B are schematic views of an example computing device 100 that includes an antenna module with at least one mesh patch antenna, in accordance with one or more aspects of this disclosure. FIG. 1A illustrates a cross section of computing device 100 along an X-Y plane and FIG. 1B illustrates a cross section of computing device 100 along an X-Z plane. Examples of computing device 100 include a mobile phone, a tablet computer, a laptop computer, a wearable device (e.g., a computerized watch, computerized eyewear, computerized headphones, computerized gloves, etc.), a home automation device or system (e.g., an intelligent thermostat or home assistant device), a gaming system, a media player, an e-book reader, a mobile television platform, or any other type of mobile, wearable, and non-wearable computing device. Computing device 100 may be an individual mobile computing device.

In some examples, computing device 100 may have 5G MM wave capabilities. Computing device 100 may include one or more of a battery 102, main logic board (MLB) 104, integrated circuit (IC) 106, interconnect components 107, a plurality of antenna arrays 108A and 108B (collectively, "antenna arrays 108"), and/or a transceiver 110.

Battery 102 may store electrical power and providing the stored electrical power to other components of computing device 100. Examples of battery 102 include, but are not limited to, lithium-ion, a nickel-cadmium, nickel-metal hydride, lead acid, and lithium-ion polymer batteries. In some examples, battery 102 may include a single battery. In other examples, battery 102 may include multiple batteries (e.g., to increase capacity and/or due to internal geometry). Battery 102 may, in some examples, be generally a rectangular prism having a top, sides, and a bottom.

MLB 104 may be a circuit board that carries one or more components of computing device 100. As shown in FIGS. 1A and 1B, MLB 104 may carry transceiver 110 (e.g., transceiver 110 may be attached to MLB 104).

Transceiver 110 may include components configured to transmit and receive signals. In some examples, transceiver 110 may include a mmWave transceiver (e.g., a transceiver capable of transmitting and receiving signals having mm range wavelengths.

Antenna arrays 108 may transmit and receive wireless signals. As shown in FIGS. 1A and 1B, antenna arrays 108 may be positioned to transmit and receive wireless signals in different directions. For instance, antenna array 108A may be positioned within computing device 100 to transmit and receive wireless signals in a first direction and antenna array 108B may be positioned within computing device 100 to transmit and receive wireless signals in a second direction perpendicular to the first direction. As shown in FIGS. 1A and 1B, the first direction may be through a top of computing device 100 (direction 120T) and the second direction may be through a back of computing device 100 (direction 120B). As such, antenna array 108A may be referred to as a top firing antenna array and antenna array 108B may be referred to as a back firing antenna array.

IC 106 may control operations of antenna arrays 108. For instance, IC 106 may be a phased array and/or power management IC that controls signals being output by antenna arrays 108. As shown in FIGS. 1A and 1B, IC 106 may be connected to transceiver 110 via interconnect components 107.

Antenna arrays 108 and IC 106 may be located on an antenna module, such as antenna module 109. For instance, antenna array 108A, antenna array 108B, and IC 106 may all be located on antenna module 109, which may be connected to transceiver 110 via interconnection components 107. By using such an antenna module, multiple antenna arrays (i.e., antenna array 108A and 108B) may be driven by a single IC (i.e., IC 106). In this way, aspects of this disclosure may reduce a cost and/or part count of computing device 100.

In some examples, one or more of antenna arrays 108 may comprise a meshed patch structure. For instance, antenna array 108A may be formed of a mesh of vias and traces on a multi-layer printed circuit board. Further details of one example of antenna arrays 108 are discussed below. Antenna arrays 108 may each have one or more planes. Signals transmitted by an antenna array of antenna arrays 108 may generally travel in a direction perpendicular to planes of the antenna array.

Computing device 100 may include enclosure 101 that generally contains other components of computing device 100 (e.g., battery 102, MLB 104, IC 106, antenna arrays 108, etc.). Enclosure 101 may also be referred to as a housing. In general, enclosure 101 may be formed of various materials, including metals, plastics, ceramics, glass, etc. As one specific example, enclosure 101 may be primarily formed from metal. However, wireless signals may not propagate well (e.g., may experience high loss) though metals. As such, in some examples, enclosure 101 may include one or more inserts to facilitate wireless signals passing between components of computing device 100 and the outside world. For instance, as shown in FIGS. 1A and 1B, enclosure 101 may include non-metallic portions 103A and 103B (collectively, "non-metallic portions 103"). Non-metallic portions 103 may generally be placed "over" antenna arrays 108. For instance, as shown in FIG. 1B. non-metallic portion 103B may be positioned over antenna array 108B such that signals output by antenna array 108B may easily exit computing device 100 through non-metallic portion 103B. However, in some cases, it may not be possible to position a non-metallic portion directly over an antenna array. For instance, due to design constraints (e.g., internal geometry, corner clearances, etc.), it may not be possible for non-metallic portion 103A to be placed directly over antenna array 108B. As such, if antenna array 108B emits wireless signals generally perpendicular to the X-Z plane (e.g., arrows in direction 120T of FIG. 1B), said wireless signals may not fully benefit from non-metallic portion 103A.

In accordance with one or more aspects of this disclosure, one or both of antenna arrays 108 may have planes that are angled to transmit and/or receive wireless signals through one or more of non-metallic portions 103. For instance, as shown in FIG. 1B, non-metallic portion 103A may not be aligned with antenna array 108A. As such, planes of antenna array 108A may be angled (e.g., rotated counter-clockwise in the reference plane of FIG. 1B) such that signals transmitted by antenna array 108A pass through non-metallic portion 103A. For instance, planes of antenna array 108A may be angled to aim signals emitted by antenna array 108A at non-metallic portion 103A. In this way, aspects of this disclosure may enable more flexible placement of antenna arrays while minimizing wireless signal attenuation.

While FIGS. 1A and 1B show computing device 100 having an antenna system including one or more of first antenna array 108A or second antenna array 108B, computing device 100 may have multiple antenna systems. The computing device 100 may be, for example, a smartphone, tablet, laptop, smartwatch or other mobile computing device, or may be any other computing device that may include multiple radios and antenna systems for communication over different wireless links. For example, a smartphone may include a 5G NR radio, a 4G LTE radio, and a Wi-Fi radio. The 5G radio may include an antenna system including one or more antenna arrays 108 for use in two frequency ranges, frequency range 1 (FR1) which may include sub-6 GHz frequency bands, and frequency range 2 (FR2), which may include bands above 24 GHz including frequencies in the mm Wave band.

Figure 2:
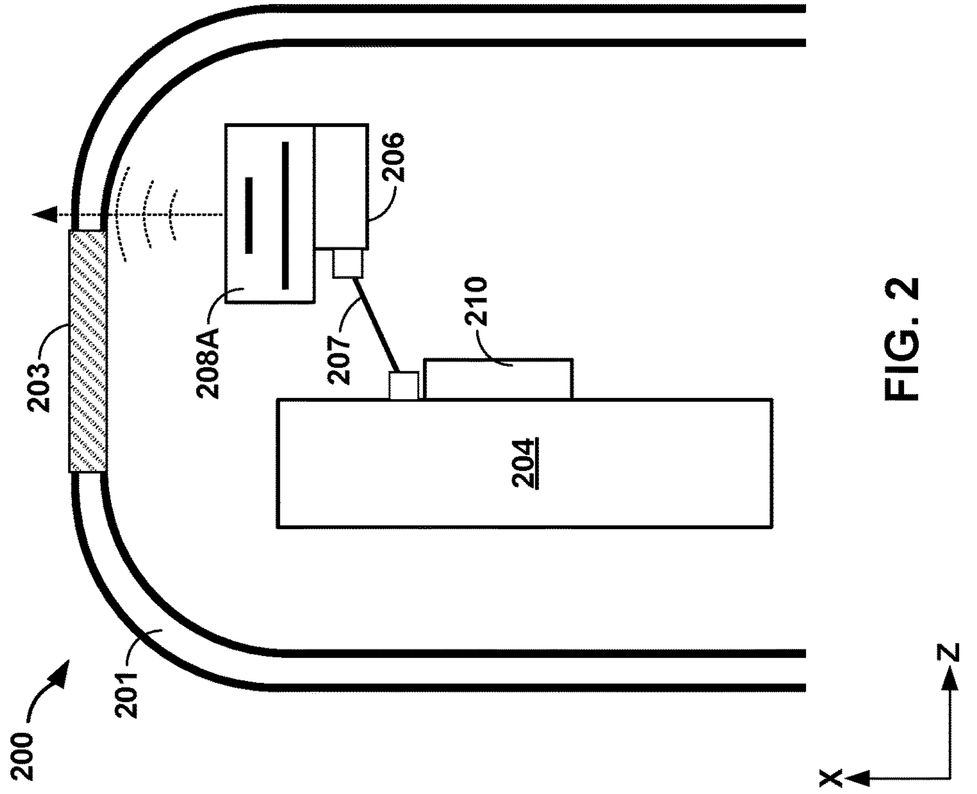
FIG. 2 is a schematic view of a computing device, in accordance with one or more aspects of this disclosure.

FIG. 2 is a schematic view of a computing device, in accordance with one or more aspects of this disclosure. Computing device 200 of FIG. 2 may be an example of computing device 100 of FIGS. 1A and 1B. Similarly, enclosure 201, non-metallic portion 203, MLB 204, IC 206, interconnection components 207, antenna array 208A, and transceiver 210 of FIG. 2 may be examples of enclosure 101, non-metallic portion 103, MLB 104, IC 106, interconnection components 107, antenna array 108A, and transceiver 110 of FIGS. 1A and 1B.

As discussed above, in some examples, planes of antenna array 208A may be formed as a mesh of traces and vias in a multi-layer substrate. For instance, planes of antenna array 208A may be either parallel or perpendicular to layers of the multi-layer substrate. In the example of FIG. 2, the planes of antenna array 208A are shown as being parallel with the Y-Z plane. As such, wireless signals emitted by antenna array 208A may generally travel along the positive X axis. In examples where non-metallic portion 203 is not aligned with antenna array 208A, such as the example of FIG. 2, such arrangement of planes of antenna array 208A may result in transmitted wireless signals not receiving the full benefit of non-metallic portion 203.

Figure 3:
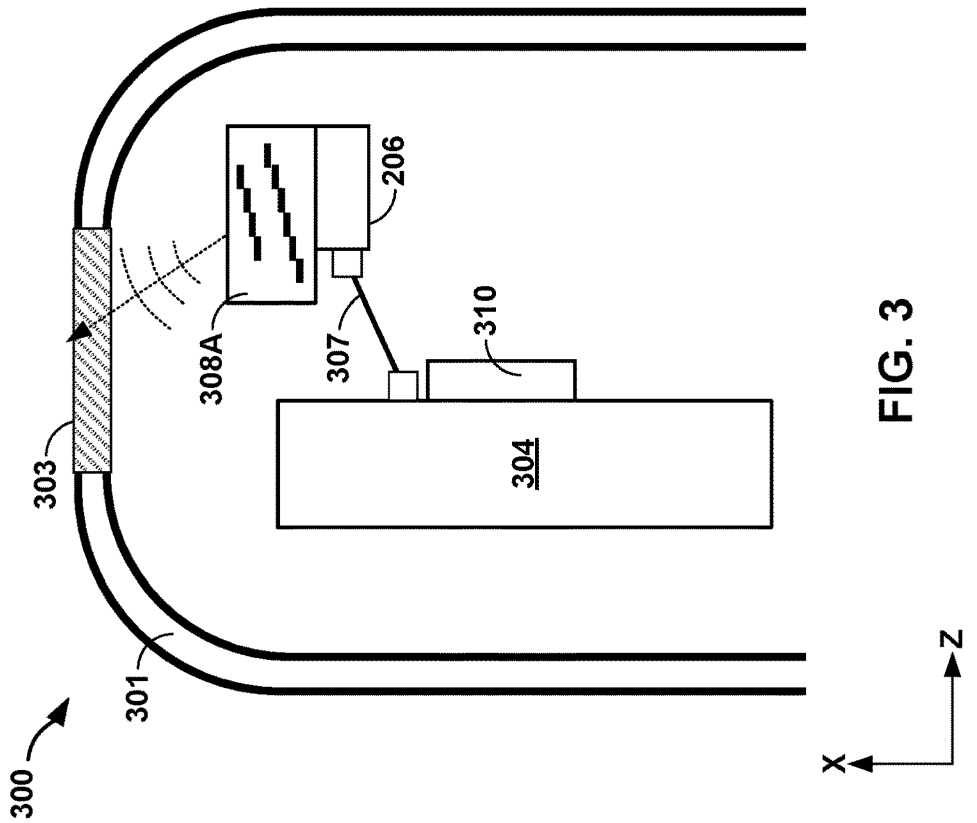
FIG. 3 is a schematic view of a computing device, in accordance with one or more aspects of this disclosure.

FIG. 3 is a schematic view of a computing device, in accordance with one or more aspects of this disclosure. Computing device 300 of FIG. 3 may be an example of computing device 100 of FIGS. 1A and 1B. Similarly, enclosure 301, non-metallic portion 303, MLB 304, IC 306, interconnection components 307, antenna array 308A, and transceiver 310 of FIG. 3 may be examples of enclosure 101, non-metallic portion 103, MLB 104, IC 106, interconnection components 107, antenna array 108A, and transceiver 110 of FIGS. 1A and 1B.

As discussed above, it may be desirable for planes of an antenna array to be angled (e.g., in order to for transmitted wireless signals to benefit of a non-metallic portion). In accordance with one or more aspects of this disclosure, planes of antenna array 308A may be angled (e.g., with respect to layers of a multi-layer substrate in which antenna array 308A is formed). As shown in the example of FIG. 3, angling planes of antenna array 308A may result in wireless signals transmitted by antenna array 308A receiving more benefit from non-metallic portion 303 (e.g., as compared to the example of FIG. 2). Antenna array 308A may be considered to receive more benefit as a higher portion of signals transmitted by antenna array 308A may travel through non-metallic portion 303, thereby receiving reduced attenuation during exit from computing device 300.

Figure 4:
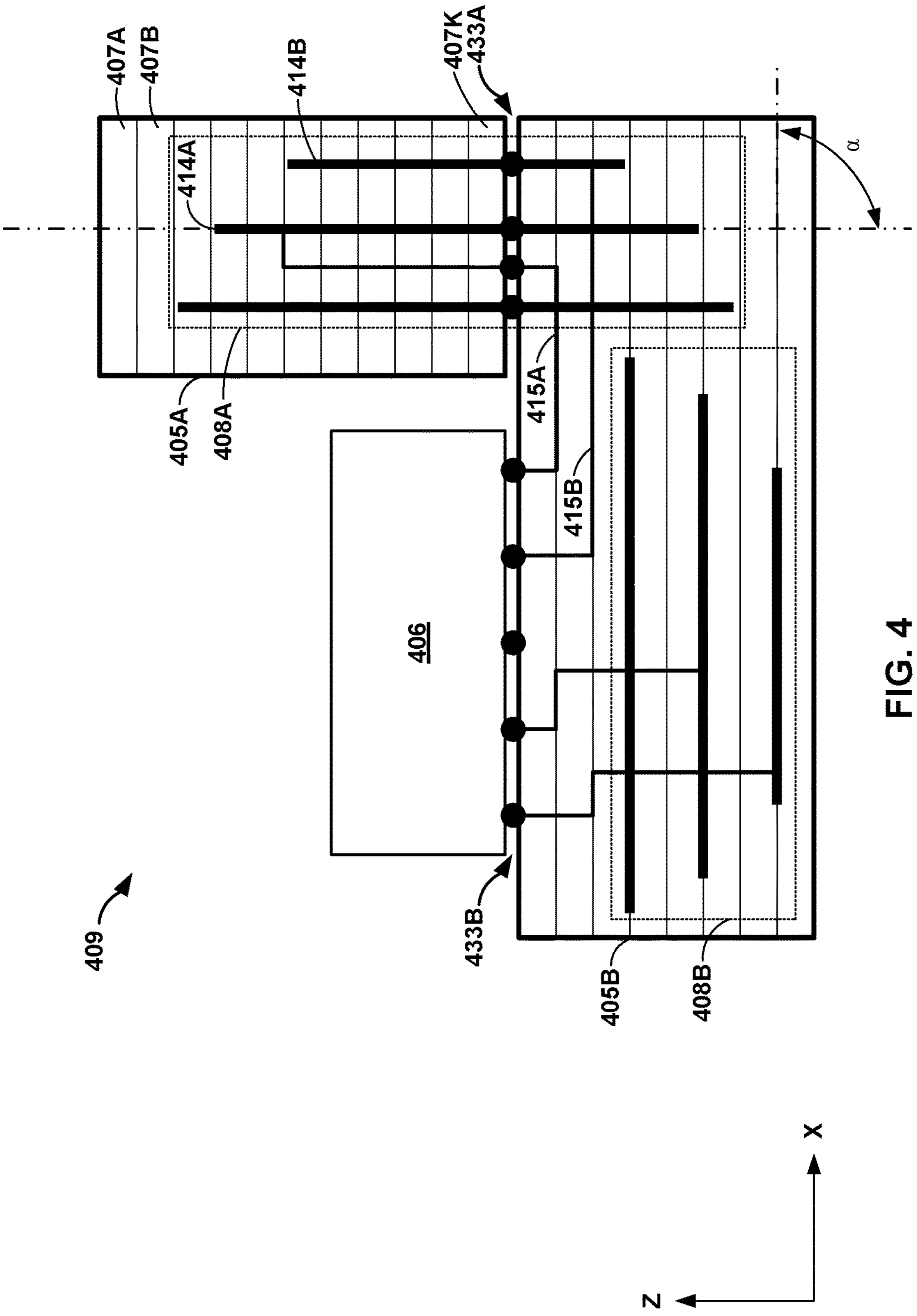
FIG. 4 is a schematic view of an example antenna module, in accordance with one or more aspects of this disclosure.

FIG. 4 is a schematic view of an example antenna module, in accordance with one or more aspects of this disclosure. As shown in FIG. 4, antenna module 409 may include IC 406, and substrates 405A and 405B (collectively, "substrates 205"). Antenna module 409 and IC 406 of FIG. 4 may be examples of antenna module 109 and IC 106 of FIGS. 1A and 1B.

Substrates 405 may be circuit boards, such as printed circuit boards (PCBs), that carry antenna arrays 408A and 408B (collectively, "antenna arrays 408"). Substrates 405 may be multi-layer circuit boards. For instance, as shown in FIG. 4, substrate 405A may include layers 407A-407K (collectively, "layers 407"). While illustrated as including a particular number of layers, substrates 405 are not so limited (e.g., may include more or fewer layers than shown in FIG. 4).

As shown in FIG. 4, substrates 405A and 405B may be attached to each other. Similarly, IC 406 may be attached to one or both of substrates 405. For instance, as shown in FIG. 4, IC 406 may be attached to substrate 405B. In some examples, substrates 405 may be interconnected, and IC 406 may be attached to substrate 405B, via surface mount technology (SMT). For instance, as shown in FIG. 4, substrate 405A may be attached to substrate 405B with SMT via solder deposits 433A. Similarly, as shown in FIG. 4, IC 406 may be attached to substrate 405B with SMT via solder deposits 433B.

Antenna arrays 408 of FIG. 4 may be examples of antenna arrays 108 of FIGS. 1A and 1B, and antenna array 408A may be an example of antenna array 208A of FIG. 2. Antenna array 408A may include one or more planes 414, such as ground plane 414A and patch plane 414B. In some examples, one or more planes 414 of first antenna array 408A may be substantially planar type of plane. In some examples, the second antenna array 408B may also include one or more planes 414, such as a ground plane and a patch plane shown in the first antenna array 408A.

In some examples, the planes of the first antenna array 408A may be positioned vertically and the planes of the second antenna array 408B may be positioned horizontally (e.g., at least one plane of first antenna array 408A may be perpendicular to at least one plane of second antenna array 408B). In some examples, the planes of the first antenna array 408A may be positioned in a substantially perpendicular direction to the planes of the second antenna array 408B. For example, substantially perpendicular may be +/−5 degrees of being perpendicular. As such, first antenna array 408A and second antenna array 408B may form an "L" shape. Positioning the respective planes 414 of an antenna array 408, such as the first antenna array 408A or the second antenna 408B, horizontally or vertically may change a direction a beam is transmitted by the respective antenna array 408. Accordingly, a direction a beam may be transmitted by a respective antenna array 408 may be manipulated by the alignment of the positioning of the planes of the antenna array 408, such as the planes being horizontally aligned or vertically aligned. In some examples, the planes 414 of an antenna array 408 being horizontally aligned would have the planes 414 aligned to extend in the z-direction and y-direction, as shown in FIG. 4. In some examples, the planes 414 of an antenna array 408 being vertically aligned would have the planes 414 aligned to extend in the x-direction and z-direction, as shown in FIG. 4.

In the example as shown FIG. 4, second antenna array 408B may be a back transmitting array that is configured to transmit signals in back direction (e.g., in a negative direction along the Z axis) and first antenna array 408A may be a top transmitting antenna array that is configured to transmit signals in a top direction (e.g., positive direction along the X axis).

As discussed above, and in accordance with one or more aspects of this disclosure, one or more of antenna arrays 408 may comprise a meshed patch structure. For instance, antenna array 408B may be comprise of a meshed patch structure that is formed of a plurality of traces and vias distributed across one or more of substrates 405. As shown in FIG. 4, portions of one or more of planes 414 of antenna array 408A may be in multiple substrates of substrates 405 (e.g., parts of at least plane 414A are shown in both substrate 405A and 405B). While shown as being in two substrates, antenna array 408A is not so limited and may be positioned in a single substrate, three substrates, or greater than three substrates.

As discussed above, IC 406 may drive antenna arrays 408. As shown in FIG. 4, antenna module 409 may include connections between IC 406 and planes of antenna arrays 408. For instance, IC 406 may output a first signal (e.g., a ground signal) to ground plane 414A of antenna array 408A via signal line 415A and output a second signal (e.g., a data signal) to patch plane 414B of antenna array 408A via signal line 415B. In some examples, signal lines may cross between substrates 405. For instance, as shown in FIG. 4, signal line 415A may cross from substrate 405B to substrate 405A. Antenna module 409 include similar signal lines between IC 406 and antenna array 408B. As such, RF signals may be routed through substrates 405 to feed elements of antenna arrays 408.

Figure 5:
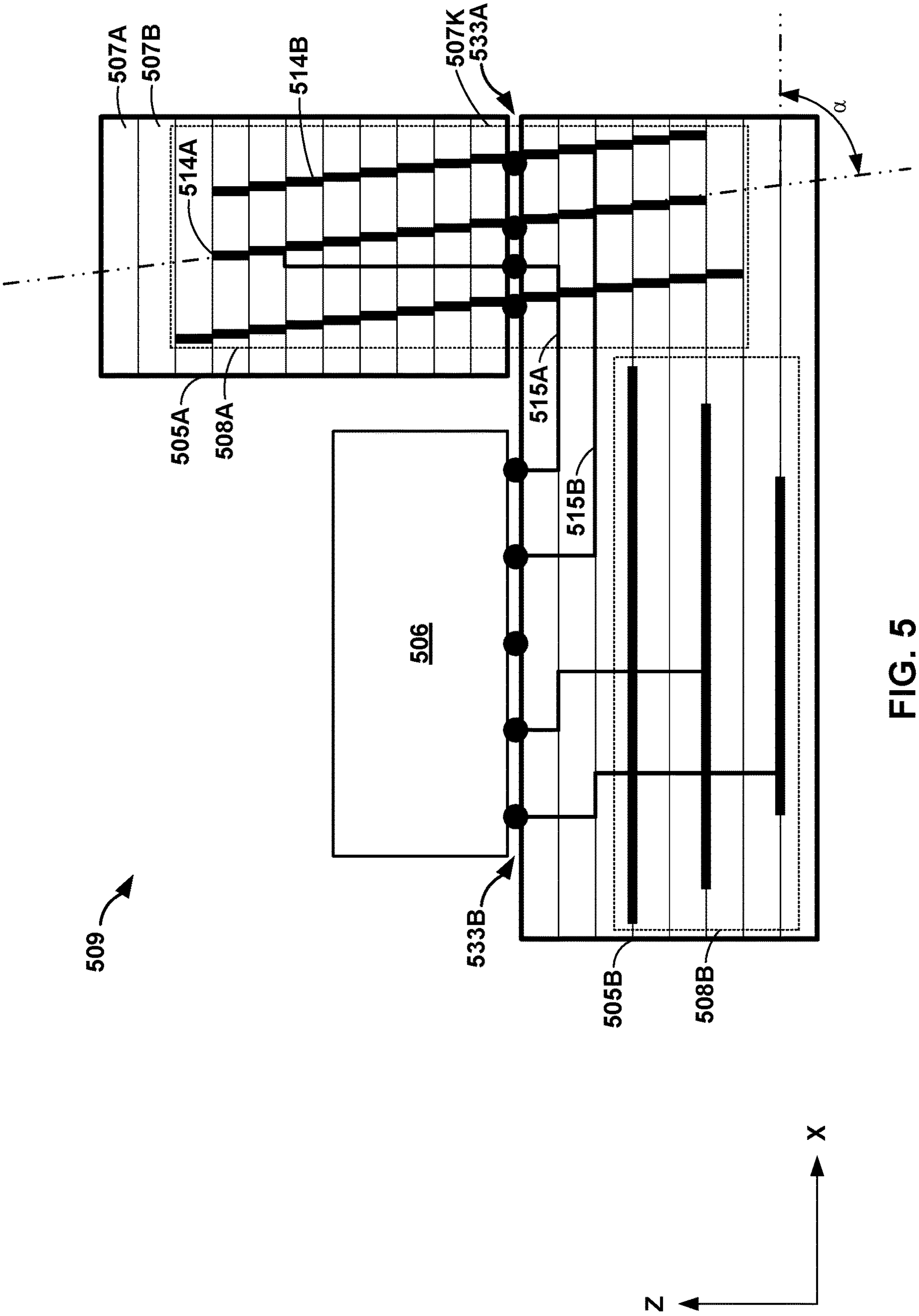
FIG. 5 is a schematic view of an example antenna module, in accordance with one or more aspects of this disclosure.

FIG. 5 is a schematic view of an example antenna module, in accordance with one or more aspects of this disclosure. As shown in FIG. 5, antenna module 509 may include IC 506, and substrates 505A and 505B (collectively, "substrates 505"). Antenna module 509 and IC 506 of FIG. 5 may be examples of antenna module 109 and IC 106 of FIGS. 1A and 1B.

Substrates 505 may be circuit boards, such as printed circuit boards (PCBs), that carry antenna arrays 508A and 508B (collectively, "antenna arrays 408"). Substrates 505 may be multi-layer circuit boards. For instance, as shown in FIG. 5, substrate 505A may include layers 507A-507K (collectively, "layers 507"). While illustrated as including a particular number of layers, substrates 505 are not so limited (e.g., may include more or fewer layers than shown in FIG. 5).

As shown in FIG. 5, substrates 505A and 505B may be attached to each other. Similarly, IC 506 may be attached to one or both of substrates 505. For instance, as shown in FIG. 5, IC 506 may be attached to substrate 505B. In some examples, substrates 505 may be interconnected, and IC 506 may be attached to substrate 505B, via surface mount technology (SMT). For instance, as shown in FIG. 5, substrate 505A may be attached to substrate 505B with SMT via solder deposits 533A. Similarly, as shown in FIG. 5, IC 506 may be attached to substrate 505B with SMT via solder deposits 533B.

IC 506 may drive antenna arrays 508. As shown in FIG. 5, antenna module 509 may include connections between IC 506 and planes of antenna arrays 508. For instance, IC 506 may output a first signal (e.g., a ground signal) to ground plane 514A of antenna array 508A via signal line 515A and output a second signal (e.g., a data signal) to patch plane 514B of antenna array 508A via signal line 515B. In some examples, signal lines may cross between substrates 505. For instance, as shown in FIG. 5, signal line 515A may cross from substrate 505B to substrate 505A. Antenna module 509 include similar signal lines between IC 506 and antenna array 508B. As such, RF signals may be routed through substrates 505 to feed elements of antenna arrays 508.

Antenna arrays 508 of FIG. 5 may be examples of antenna arrays 108 of FIGS. 1A and 1B, and antenna array 508A may be an example of antenna array 308A of FIG. 3. Antenna array 508A may include one or more planes 514, such as ground plane 514A and patch plane 514B. In some examples, one or more planes 514 of first antenna array 508A may be substantially planar type of plane. In some examples, the second antenna array 508B may also include one or more planes 514, such as a ground plane and a patch plane shown in the first antenna array 508A.

As discussed above, one or more of antenna arrays 508 may comprise a meshed patch structure. For instance, antenna array 508B may be comprise of a meshed patch structure that is formed of a plurality of traces and vias distributed across one or more of substrates 505. As shown in FIG. 5, portions of one or more of planes 514 of antenna array 508A may be in multiple substrates of substrates 505 (e.g., parts of at least plane 514A are shown in both substrate 505A and 505B). While shown as being in two substrates, antenna array 508A is not so limited and may be positioned in a single substrate, three substrates, or greater than three substrates.

In accordance with one or more aspects of this disclosure and as discussed above, planes of an antenna array may be angled with respect to layers of multi-layer substrates in which the antenna array is formed. For instance, as can be seen in FIG. 5, an angle between ground plane 514A and layers 507 (shown as angle $\alpha$) may be greater than zero and less than 90 degrees. In some examples, angle $\alpha$ may be further narrowed to a range of 15 to 75 degrees. This aspect of FIG. 5 is in contrast to the example of FIG. 4 in which an angle between ground plane 414A and layers 407 is 90 degrees. As discussed below in further detail, angling of planes of an antenna array formed of a mesh via structure may be accomplished by offsetting vias/traces in successive rows. For instance, as shown in FIG. 5, the via through layer 507D is farther to the right (along the positive X axis) than the via through layer 507C.

Figure 6A:
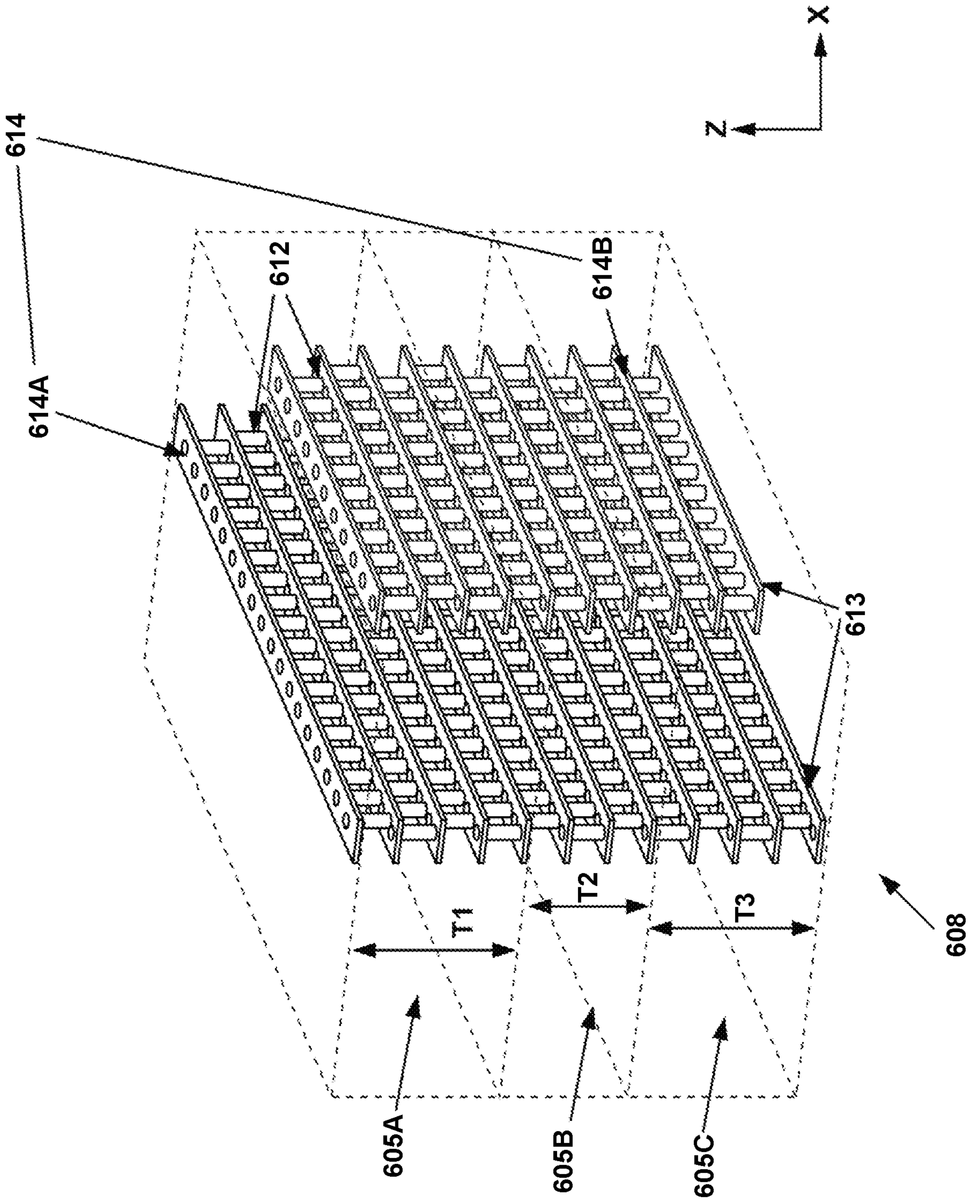
FIGS. 6A-6C are conceptual diagram illustrating an example mesh patch antenna, in accordance with one or more aspects of this disclosure.
Figure 6B:
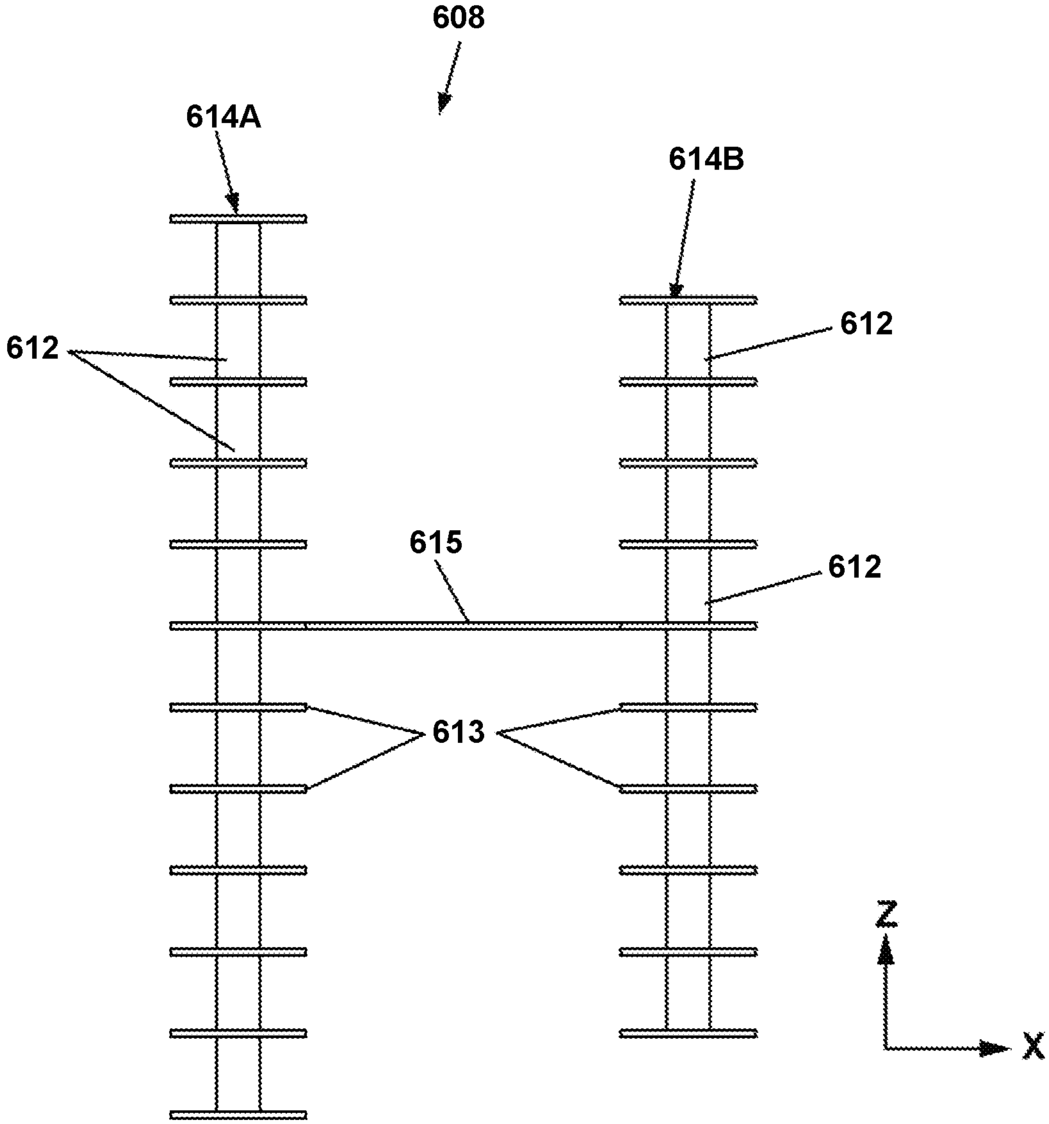
Figure 6C:
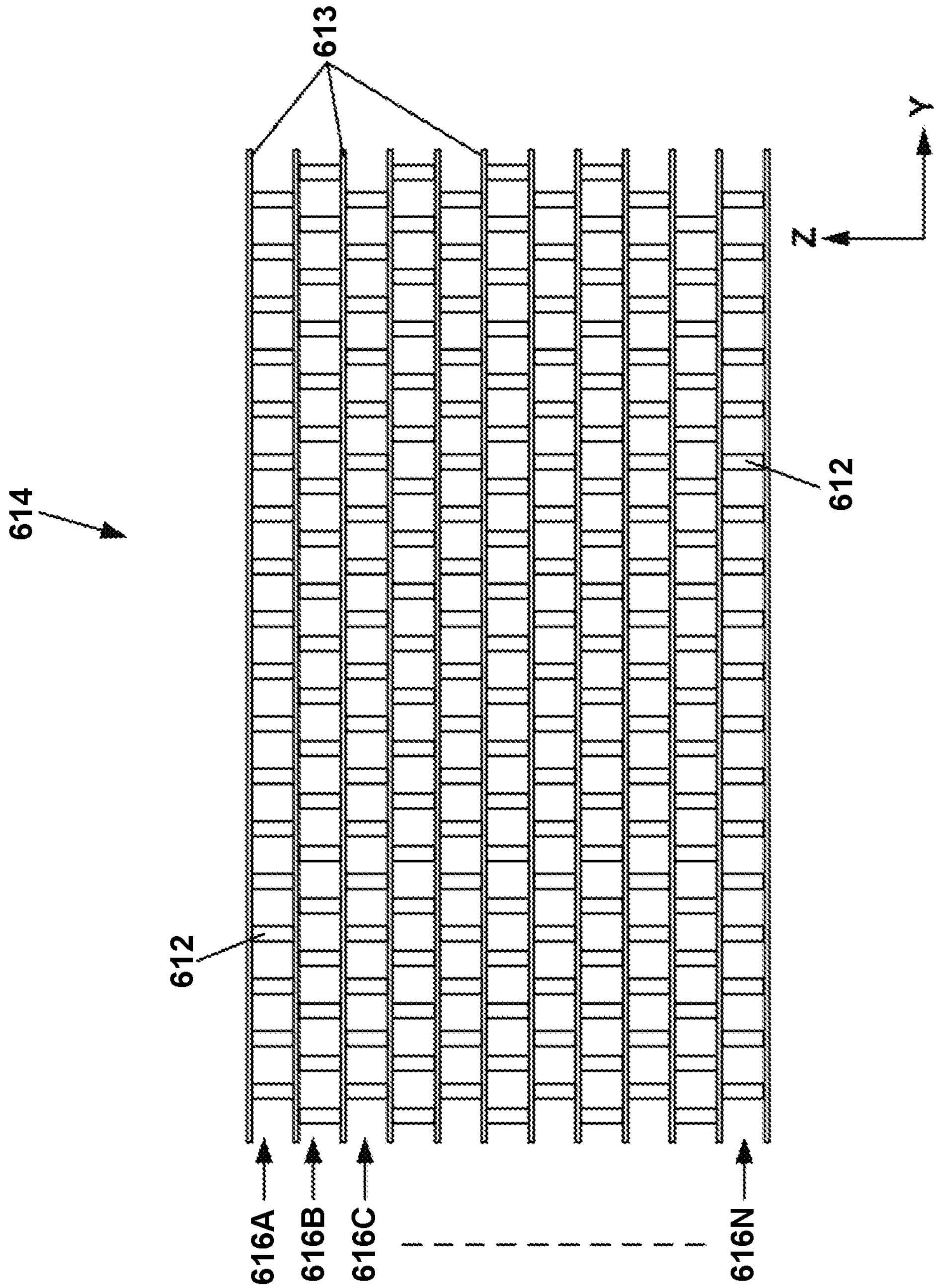

FIGS. 6A-6C are conceptual diagram illustrating an example mesh patch antenna, in accordance with one or more aspects of this disclosure. Antenna array 608, substrates 605A-605C (collectively, "substrates 605"), and planes 614 of FIGS. 6A-6C may be examples of antenna array 408A, substrates 405, and planes 414 of FIG. 4.

One or more of the planes 614 of antenna array 608A may include a meshed patch structure that includes a plurality of vias 612 and traces 613 arranged in a mesh-like structure, as shown in FIGS. 6A-6C. In some examples, the plurality of traces 613 may be on layers of substrates 605 (e.g., on layers of layers 407).

FIG. 6A is a schematic perspective view of an example configuration of an antenna array 608. In some examples, the antenna array 608 may include one or more planes 614. The antenna array 608 includes a ground plane 614A and a patched plane 614B. A plane, 614, such as ground plane 614A or a patched plane 614B, may include a plurality of traces 613 and a plurality of vias 612 (e.g., spaces, holes, and/or through holes) arranged between the respective traces 613 to form the meshed patch structure. For example, drilling a board, such as an aluminum or copper board, of a plane 614 forms through holes to generate the vias 612 of a plane 614. In some examples, the drilled through holes (e.g., vias 612) may be coated with a conductive material. In some examples, one or more the plurality of vias 612 may provide an electrical connection between traces 613 of a respective plane 614. For example, the ground plane 614A may include a plurality of traces 613 and a plurality of vias 612 arranged between the respective traces 613 to form the meshed patch structure of the ground plane 614A. For example, the patched plane 614B may include a plurality of traces 613 and a plurality of vias 612 arranged between the respective traces 613 to form the meshed patch structure of the patched plane 614B.

FIG. 6A further shows an example configuration of an antenna array 608, such as the first antenna array 108A and/or the second antenna array 108B. FIG. 6A vias 612 and traces 613 of antenna array 608 being distributed across three substrates 605A, 605B, and 605C. In some examples, substrates 605 may all be a same type of substrate. In some examples, a first substrate of substrates 605 and a second substrate of substrates 605 may be different types of substrates. Examples of substrates include, but are not limited to, high frequency PCBs, laminated circuit boards (e.g., an FR4 type board or polytetrafluoroethylene (PTFE) board), and the like.

As shown in FIG. 6A, substrates 605A-605C respectively have thicknesses T1-T3. In some examples, thicknesses T1-T3 may be equal to each other. In other examples, thickness T1 may be different than thickness T2 and/or different than thickness T3. Utilizing one or more substrates with different thicknesses may provide various advantages. As one example, such an arrangement may enable a height of a combination of substrates 605 (e.g., in the Z axis of FIG. 2) to be tailored to more closely match a height of antenna array 608 without unduly increasing a thickness an antenna module, such as antenna module 609.

FIG. 6B is a schematic side view of an example configuration of an antenna array 608, such as the first antenna array 608A and/or the second antenna array 608B. The antenna array 608 includes a ground plane 614A and a patched plane 614B. The ground plane 614A and the patched plane 614B of the antenna array 608 each respectively include a plurality of traces 613 and a plurality of vias 612 arranged between the respective traces 613. The antenna array may include a connector 615 that connects the ground plane 614A and the patched plane 614B. In some examples, the antenna array 608 may include a plurality of connectors 615 (e.g., which may carry signals from an IC, such as IC 406).

FIG. 6C is a schematic front or rear view of an example configuration of a plane 614 of an antenna array 608, such as the first antenna array 108A and/or the second antenna array 108B. The plane 614 shown in FIG. 6C may be an example of a ground plane 614A and/or a patched plane 614B of the antenna array 608. The plane 614 includes a plurality of traces 613 and a plurality of vias 612 arranged between the respective traces 613. In some examples, a plane 614 may include a plurality of rows 616A, 616B . . . 616N of vias 612 with traces 613 arranged between the respective rows of vias 612. A row 616, such as any of rows 616A, 616B . . . 616N, may include one or more traces 613 and one or more vias 612. In some examples, the vias 612 of a particular row, such as row 616A, may be arranged in an off-set position from the vias 612 in a neighboring row, such as row 616B. In some examples, the vias 612 of a plane 614 may be arranged in a grid like fashion. In some examples, the vias 612 of a particular row, such as row 616A, may be arranged in an off-set position from the vias 612 in a neighboring row, such as row 616B, but arranged to correspond to the arrangements of the vias 612 of an alternating row, such as row 616C, as shown in FIG. 6C. In some examples, a plane 614 may include a plurality of traces 613. One or more of the rows 616 may have a trace 613 on top and on the bottom of a particular row. In some examples, a trace 613 may serve as a bottom trace for a particular row, but serve as a top trace for a neighboring row. For example, a trace 613 may serve as a bottom trace for row 616B and a top trace for row 616C.

The planes 614 of an antenna array 608 having a meshed patch structure including a plurality of traces 613 and a plurality of vias 612, such as shown in FIGS. 6A-6C, may enable a plurality of antenna arrays to use the same IC to drive the transmission of signals (e.g., as opposed to using a dedicated phase array IC and cables for each respective antenna array). In this way, the planes 614 of an antenna array 608 having a meshed patch structure may reduce insertion losses, enhance coverage and/or reduce costs to produce a mobile computing device.

As can be seen from FIGS. 4 and 5, an antenna module may include a plurality of multi-layer substrates attached to each other with layers of a first substrate of the plurality of substrates being substantially parallel to layers of a second substrate of the plurality of substrates (e.g., substrates 405/505); and a plurality of antenna arrays (e.g., antenna arrays 408/508) that each have planes formed by features of the plurality of substrates. As can be seen from FIGS. 6A-6C, the features of the plurality of substrates that form planes of a first antenna array may include a plurality of vias and a plurality of traces arranged in a mesh structure.

Figure 7A:
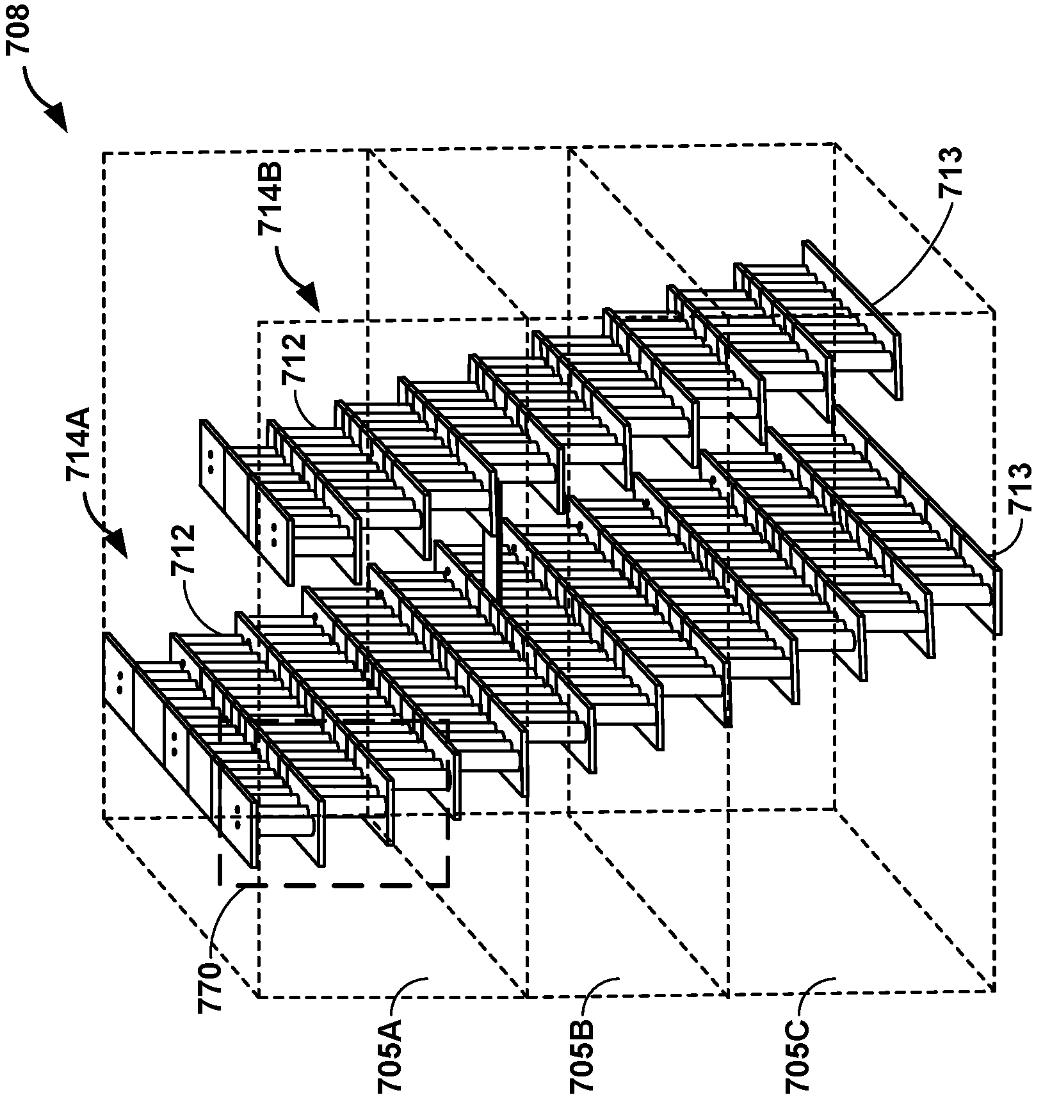
FIGS. 7A and 7B are conceptual diagram illustrating an example mesh patch antenna, in accordance with one or more aspects of this disclosure.
Figure 7B:
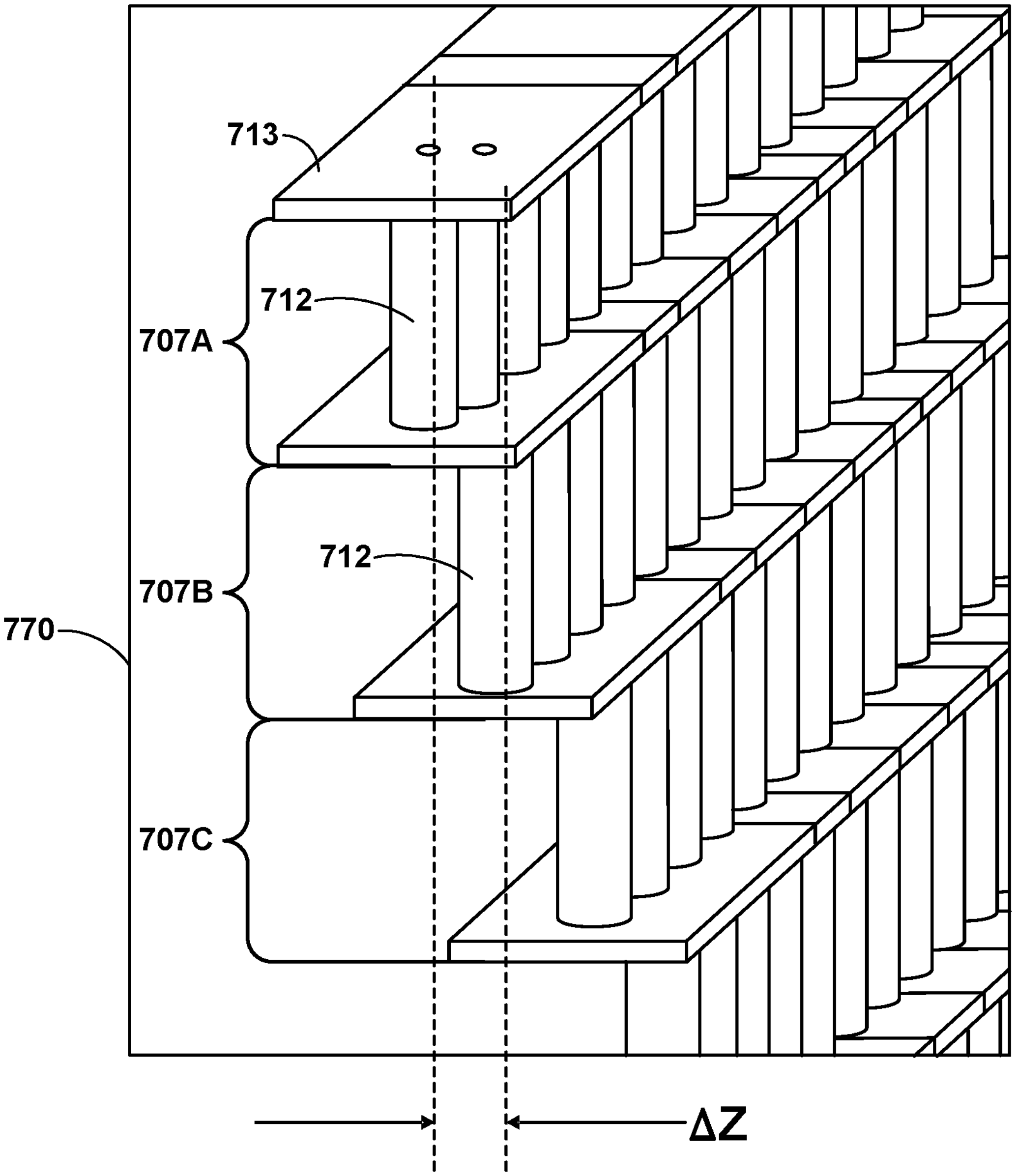

FIGS. 7A and 7B are conceptual diagram illustrating an example mesh patch antenna, in accordance with one or more aspects of this disclosure. Antenna array 708, substrates 705A-705C (collectively, "substrates 705"), and planes 714A and 714B (collectively, "planes 714") of FIGS. 7A and 7B may be examples of antenna array 508A, substrates 505, and planes 514 of FIG. 5. FIG. 7B shows an enlarged portion of antenna array 708 of FIG. 7A denoted by box 770.

One or more of the planes 714 of antenna array 708A may include a meshed patch structure that includes a plurality of vias 712 and traces 713 arranged in a mesh-like structure, as shown in FIGS. 7A and 7B. In some examples, the plurality of traces 713 may be on layers of substrates 705 (e.g., on layers of layers 707A-707C, collectively "layers 707").

Antenna array 708 may be similar to antenna array 608. However, planes 714 of antenna array 708 may be angled with respect to layers of substrates 705. For instance, an angle between planes 714 and layers of substrates 705 may be greater than zero but less than 90. As such, planes 714 may be neither parallel nor perpendicular to layers of substrates 705. Angling of planes 714 may be accomplished by offsetting locations of vias 712 and traces 713 between layers. For instance, traces of traces 713 on a first layer (e.g., layer 707B) of a substrate of substrates 705 may be offset from traces of traces 713 on a second layer (e.g., layer 707C) of the substrate of substrates 705. In this example, traces/vias of layer 707B are shown as being offset with respect to traces/vias of adjacent layer 707C. However, as shown, some adjacent layers may not have offset traces/vias. For instance, every Nth layer may have offset traces/vias with some intervening adjacent layers not having offset traces/vias.

As shown in FIG. 7B, the offset may be denoted as $\Delta z$. Increasing values of $\Delta z$ may cause planes 714 to rotate counter-clockwise (with respect to the page), while decreasing values of $\Delta z$ may cause planes 714 to rotate clockwise.

Figure 8:
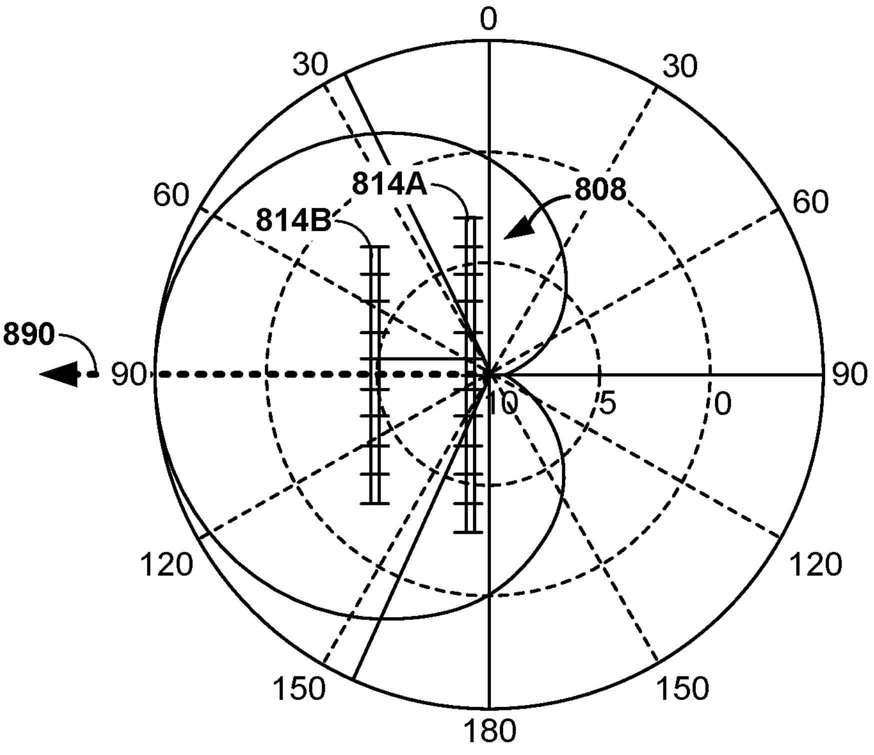
FIGS. 8 and 9 are signal diagrams illustrating example wireless signal emission patterns, in accordance with one or more aspects of this disclosure.
Figure 9:
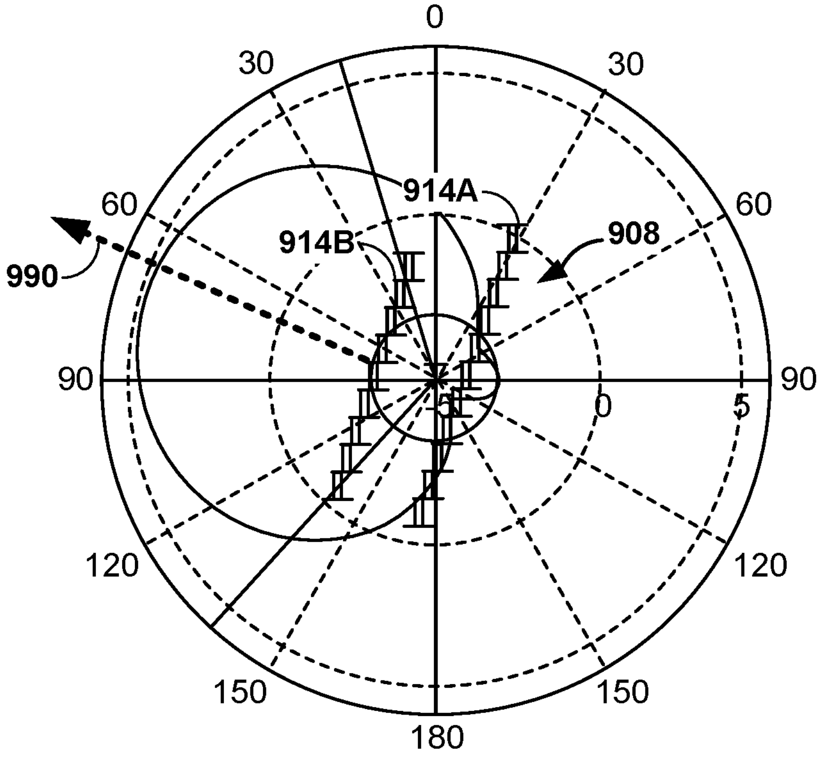

FIGS. 8 and 9 are signal diagrams illustrating example wireless signal emission patterns, in accordance with one or more aspects of this disclosure. FIG. 8A illustrates an example emission pattern of an antenna having planes that are either parallel or perpendicular to layers of substrates that form the antenna (e.g., similar to the example of FIGS. 2, 4, and 6A-6C). As such, antenna array 808 and its planes 814A and 814B of FIG. 8 may be examples of at least antenna array 408A and its planes 414A and 414B. FIG. 9 illustrates an example emission pattern of an antenna having planes that angled with respect to layers of substrates that form the antenna (e.g., similar to the example of FIGS. 3, 5, 7A, and 7B). As such, antenna array 908 and its planes 914A and 914B of FIG. 9 may be examples of at least antenna array 508A and its planes 514A and 514B.

As can be seen in FIGS. 8 and 9, wireless signals 890 and 990, respectively emitted by antenna arrays 808 and 908, may travel in a direction substantially perpendicular to planes of antenna arrays 808 and 908. Planes 814A and 814B may be perpendicular to layers of a multi-layer substrate that forms antenna array 808. As such, wireless signals 890 emitted by antenna array 808 may be transmitted parallel to the layers of the multi-layer substrate that forms antenna array 808. On the other hand, planes 914A and 914B may be angled (e.g., not parallel or perpendicular) with respect to layers of a multi-layer substrate that forms antenna array 908. As such, wireless signals 990 emitted by antenna array 908 may be transmitted at an angle (e.g., ~20 degrees) relative to the layers of the multi-layer substrate that forms antenna array 908. In this way, an antenna array formed within a multi-layer substrate may be designed to take advantage of other components, such as non-metallic portions of a housing that contains the antenna array.

The following numbered examples may illustrate one or more aspects of this disclosure:

Example 1. A mobile computing device comprising: a multi-layer substrate; and an antenna array having planes formed by features of the multi-layer substrate, wherein the features of the multi-layer substrate that form the planes of the antenna array include a plurality of vias and a plurality of traces arranged in a mesh structure, and wherein an angle between the planes of the antenna array and layers of the multi-layer substrate is greater than zero and less than 90.

Example 2. The mobile computing device of example 1, wherein a plurality of traces that form a plane of the antenna array are distributed across a plurality of layers of the multi-layer substrate, wherein traces of the plurality of traces on a first layer of the plurality of layers are offset from traces of the plurality of traces on a second layer of the plurality of layers in a direction perpendicular from the planes of the antenna array.

Example 3. The mobile computing device of example 2, wherein the first layer is adjacent to the second layer.

Example 4. The mobile computing device of any of examples 1-2, further comprising: a housing including a non-metallic portion, wherein the antenna array is located within the housing, and wherein the planes of the antenna array are angled with respect to the layers of the multi-layer substrate to aim signals emitted by the antenna array at the non-metallic portion.

Example 5. The mobile computing device of any of examples 1-4, wherein: the multi-layer substrate is a first multi-layer substrate of a plurality of multi-layer substrates attached to each other, wherein the layers of the first substrate of the plurality of substrates are substantially parallel to layers of a second substrate of the plurality of substrates; the antenna array is a first antenna array of a plurality of antenna arrays that each have planes formed by features of the plurality of substrates; the first antenna array is positioned to transmit signals in a first direction; and a second antenna array of the plurality of antenna arrays is positioned to transmit signals in a second direction that is different from the first direction.

Example 6. The mobile computing device of example 5, wherein planes of the second antenna array are parallel to the layers of the plurality of substrates.

Example 7. The mobile computing device of example 6, further comprising: a housing including a plurality of non-metallic portions, wherein the plurality of antenna arrays are located within the housing, and wherein the planes of the first antenna array are angled with respect to the layers of the multi-layer substrate to aim signals emitted by the first antenna array at a first non-metallic portion of the plurality of non-metallic portions.

Example 8. The mobile computing device of any of examples 5-7, further comprising an integrated circuit (IC) positioned on a particular substrate of the plurality of multi-layer substrates, wherein the IC drives transmission of signals from the plurality of antenna arrays.

Example 9. The mobile computing device of example 8, wherein the particular substrate is a second substrate of the plurality of substrates.

Example 10. The mobile computing device of example 8 or 9, further comprising: an antenna module that includes the plurality of substrates, the plurality of antenna arrays, and the IC.

Example 11. The mobile computing device of example 10, further comprising: a main logic board; a transceiver carried by the main logic board; and interconnection component connecting the transceiver with the IC of the antenna module.

Example 12. The mobile computing device of example 11, wherein the transceiver comprises a mmWave transceiver.

Various aspects have been described in this disclosure. These and other aspects are within the scope of the following claims.

The invention claimed is:

1. A mobile computing device comprising:

a multi-layer substrate; and an antenna array having planes formed by features of the multi-layer substrate, wherein the features of the multi-layer substrate that form the planes of the antenna array include a plurality of vias and a plurality of traces arranged in a mesh structure, and wherein an angle between the planes of the antenna array and layers of the multi-layer substrate is greater than zero and less than 90, wherein a plurality of traces that form a plane of the antenna array are distributed across a plurality of layers of the multi-layer substrate, and wherein the antenna array includes a plurality of vias connecting a first layer of the plurality of layers to a second layer of the plurality of layers.

2. The mobile computing device of claim 1, wherein traces of the plurality of traces on the first layer of the plurality of layers are offset from traces of the plurality of traces on the second layer of the plurality of layers in a direction perpendicular from the planes of the antenna array.

3. The mobile computing device of claim 2, wherein the first layer is adjacent to the second layer.

4. The mobile computing device of claim 1, further comprising:

a housing including a non-metallic portion, wherein the antenna array is located within the housing, and wherein the planes of the antenna array are angled with respect to the layers of the multi-layer substrate to aim signals emitted by the antenna array at the non-metallic portion.

5. The mobile computing device of claim 1, wherein:

the multi-layer substrate is a first multi-layer substrate of a plurality of multi-layer substrates attached to each other, wherein the layers of the first substrate of the plurality of substrates are substantially parallel to layers of a second substrate of the plurality of substrates;

the antenna array is a first antenna array of a plurality of antenna arrays that each have planes formed by features of the plurality of substrates;

the first antenna array is positioned to transmit signals in a first direction; and a second antenna array of the plurality of antenna arrays is positioned to transmit signals in a second direction that is different from the first direction.

6. The mobile computing device of claim 5, wherein planes of the second antenna array are parallel to the layers of the plurality of substrates.

7. The mobile computing device of claim 6, further comprising:

a housing including a plurality of non-metallic portions, wherein the plurality of antenna arrays are located within the housing, and wherein the planes of the first antenna array are angled with respect to the layers of the multi-layer substrate to aim signals emitted by the first antenna array at a first non-metallic portion of the plurality of non-metallic portions.

8. The mobile computing device of claim 5, further comprising an integrated circuit (IC) positioned on a particular substrate of the plurality of multi-layer substrates, wherein the IC drives transmission of signals from the plurality of antenna arrays.

9. The mobile computing device of claim 8, wherein the particular substrate is a second substrate of the plurality of substrates.

10. The mobile computing device of claim 8, further comprising:

an antenna module that includes the plurality of substrates, the plurality of antenna arrays, and the IC.

11. The mobile computing device of claim 10, further comprising:

a main logic board;

a transceiver carried by the main logic board; and interconnection component connecting the transceiver with the IC of the antenna module.

12. The mobile computing device of claim 11, wherein the transceiver comprises a mmWave transceiver.

13. The mobile computing device of claim 1, wherein the plurality of vias connecting the first layer of the plurality of layers to the second layer of the plurality of layers comprises a first plurality of vias, and wherein the antenna array includes a second plurality of vias connecting the second layer of the plurality of layers to a third layer of the plurality of layers.

14. The mobile computing device of claim 13, wherein the first plurality of vias connecting the first layer of the plurality of layers to the second layer of the plurality of layers comprise at least four vias connecting the first layer of the plurality of layers to the second layer of the plurality of layers.

15. The mobile computing device of claim 13, wherein the antenna array includes:

a third plurality of vias connecting the third layer of the plurality of layers to a fourth layer of the plurality of layers;

a fourth plurality of vias connecting the fourth layer of the plurality of layers to a fifth layer of the plurality of layers; and a fifth plurality of vias connecting the fifth layer of the plurality of layers to a sixth layer of the plurality of layers.

16. The mobile computing device of claim 15, wherein a quantity of vias included in each of the third plurality of vias, the fourth plurality of vias, and the fifth plurality of vias is at least four.

* * * * *